United States Patent
Kono et al.

(10) Patent No.: US 10,989,678 B2
(45) Date of Patent: Apr. 27, 2021

(54) X-RAY ANALYSIS SYSTEM, X-RAY ANALYSIS DEVICE, AND VAPOR PHASE DECOMPOSITION DEVICE

(71) Applicant: Rigaku Corporation, Akishima (JP)

(72) Inventors: Hiroshi Kono, Nagaokakyo (JP); Satoshi Murakami, Kyoto (JP)

(73) Assignee: RIGAKU CORPORATION, Tokyo (JP)

(*) Notice: Subject to any disclaimer, the term of this patent is extended or adjusted under 35 U.S.C. 154(b) by 0 days.

(21) Appl. No.: 16/771,229

(22) PCT Filed: Apr. 1, 2019

(86) PCT No.: PCT/JP2019/014525
§ 371 (c)(1),
(2) Date: Jun. 10, 2020

(87) PCT Pub. No.: WO2020/012730
PCT Pub. Date: Jan. 16, 2020

(65) Prior Publication Data
US 2020/0408706 A1 Dec. 31, 2020

(30) Foreign Application Priority Data
Jul. 9, 2018 (JP) .............................. JP2018-130133

(51) Int. Cl.
*G01N 23/223* (2006.01)
*G01B 15/02* (2006.01)
*G01N 23/2202* (2018.01)

(52) U.S. Cl.
CPC ......... *G01N 23/223* (2013.01); *G01B 15/025* (2013.01); *G01N 23/2202* (2013.01); *G01N 2223/076* (2013.01)

(58) Field of Classification Search
CPC ............. G01N 23/223; G01N 23/2202; G01N 2223/076; G01B 15/025
See application file for complete search history.

(56) References Cited

U.S. PATENT DOCUMENTS

| | | | |
|---|---|---|---|
| 6,577,704 B1 | 6/2003 | Holz | |
| 2003/0043963 A1* | 3/2003 | Yamagami | G01N 23/223 378/44 |

(Continued)

FOREIGN PATENT DOCUMENTS

| | | | | |
|---|---|---|---|---|
| JP | H08338819 A | * | 12/1996 | ........... G01N 23/223 |
| JP | H08338819 A | | 12/1996 | |

(Continued)

OTHER PUBLICATIONS

Rigaku—JP—H08-338819 A—English Translation—Google Patents—obtained Nov. 17, 2020 (Year: 2020).*

(Continued)

*Primary Examiner* — David P Porta
*Assistant Examiner* — Jeremy S Valentiner
(74) *Attorney, Agent, or Firm* — HEA Law PLLC

(57) ABSTRACT

Provided is an X-ray analysis system with which it is possible to set appropriate conditions for vapor phase decomposition with ease. The X-ray analysis system includes an X-ray spectrometer and a vapor phase decomposition apparatus. The X-ray spectrometer includes: an X-ray source configured to irradiate a measurement sample having a thin film present on its surface with primary X-rays; a detector configured to measure an intensity of reflected X-rays, or an intensity of fluorescent X-rays; and a calculation unit configured to calculate a film thickness or a coating mass of the thin film based on the intensity of the reflected X-rays or the fluorescent X-rays. The vapor phase decomposition apparatus includes: a vapor phase decomposition portion configured to perform vapor phase decompo- (Continued)

sition on the thin film; and a control portion configured to determine a vapor phase decomposition time based on the film thickness or the coating mass.

7 Claims, 8 Drawing Sheets

(56) References Cited

U.S. PATENT DOCUMENTS

| | | | |
|---|---|---|---|
| 2014/0119513 A1* | 5/2014 | Kim | G01N 23/20066 378/89 |
| 2014/0284478 A1* | 9/2014 | Sako | G01T 7/00 250/336.1 |
| 2017/0072378 A1* | 3/2017 | Wu | G01N 1/4044 |
| 2018/0088100 A1 | 3/2018 | Yamada | |

FOREIGN PATENT DOCUMENTS

| | | |
|---|---|---|
| JP | 2003075374 A | 3/2003 |
| JP | 2006214877 A | 8/2006 |
| JP | 2017053806 A | 3/2017 |
| JP | 2018048946 A | 3/2018 |

OTHER PUBLICATIONS

International Search Report for PCT/JP2019/014525 with English Translation.

\* cited by examiner

FIG.1
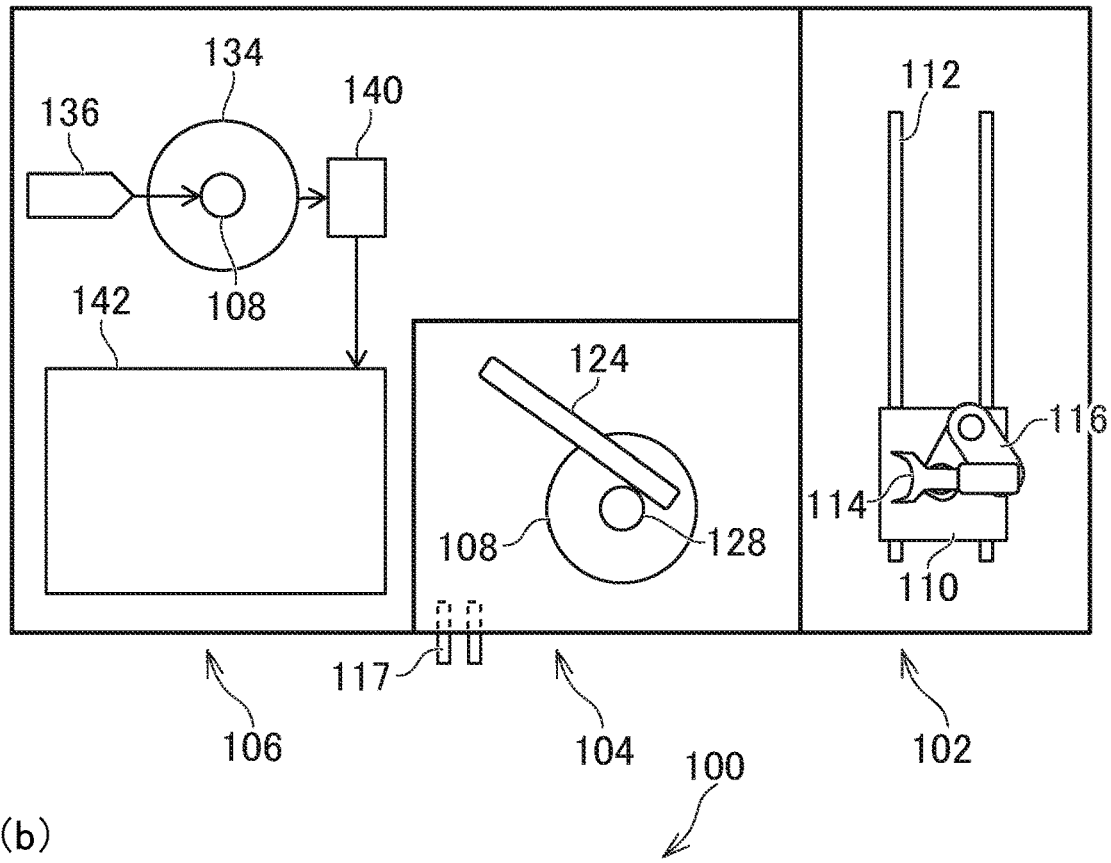
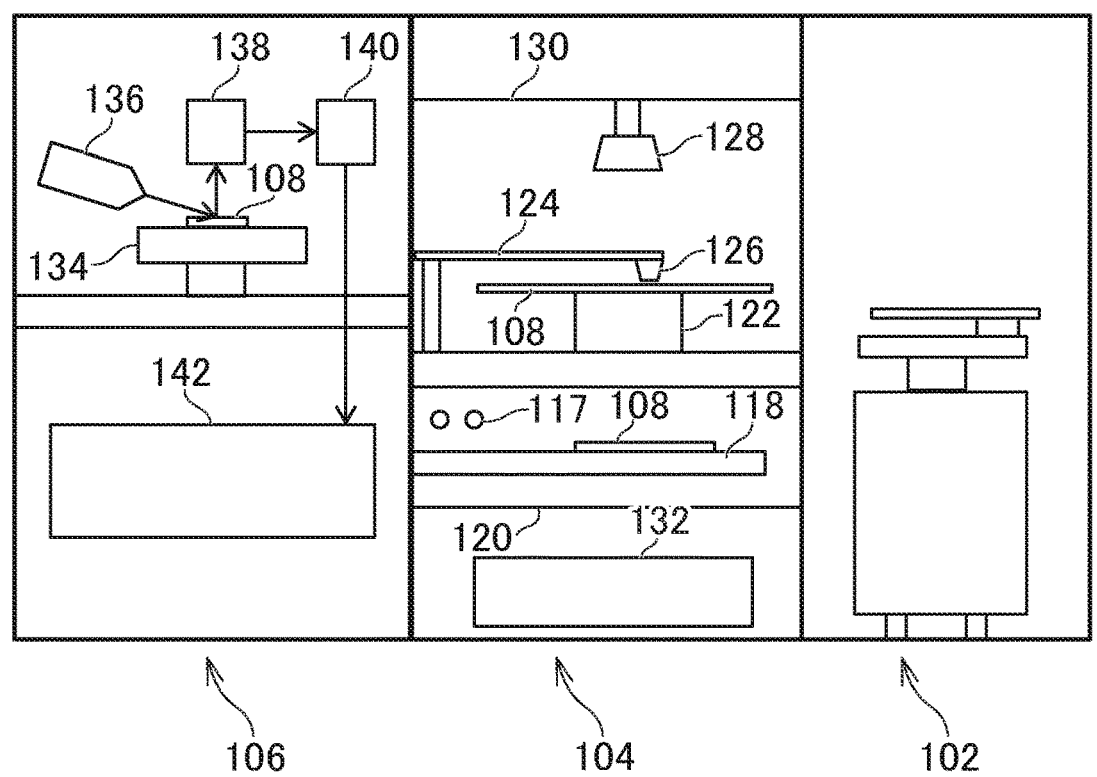

X-RAY ANALYSIS SYSTEM, X-RAY ANALYSIS DEVICE, AND VAPOR PHASE DECOMPOSITION DEVICE

CROSS REFERENCE TO RELATED APPLICATIONS

This application is a National Stage of International Application No. PCT/JP2019/014525 filed on Apr. 1, 2019, which claims priority from Japanese Application JP2018-130133 filed on Jul. 9, 2018. The contents of the above documents are incorporated herein by reference in their entirety.

TECHNICAL FIELD

The present invention relates to an X-ray analysis system, an X-ray spectrometer, and a vapor phase decomposition apparatus.

BACKGROUND ART

In the process of manufacturing a substrate to be used for a semiconductor or the like, contaminants adhering to a substrate are analyzed. Known methods of analyzing contaminants include X-ray fluorescence spectrometry, inductively coupled plasma mass spectrometry, and atomic absorption spectroscopy. Those analysis methods require a certain mass or more of contaminants, but the amount of contaminants adhering to a substrate may be too small to detect the contaminants. In view of such a case, there is known a vapor phase decomposition (VPD) method in which contaminants are subjected, or a thin film containing contaminants is subjected, to vapor phase decomposition and drying, and then the contaminants are sequentially collected from the entire or partial surface of the substrate through use of liquid droplets and concentrated in the liquid droplets, to thereby be able to analyze the contaminants. When an inductively coupled plasma mass spectrometer or an atomic absorption spectrometer is used, the collected liquid droplets are directly analyzed. When a total reflection X-ray fluorescence spectrometer is used, the collected liquid droplets are dried on the substrate, and are then analyzed.

For example, in Patent Literature 1, there is disclosed an analysis system including: a sample pretreatment apparatus configured to subject a thin film on a surface of a substrate to vapor phase decomposition and drying, then drip a solution onto the substrate, move the solution on the surface of the substrate while the solution is held by a retainer, and collect the thin film containing an object to be measured; a total reflection X-ray fluorescence spectrometer; and a transport apparatus. There is also disclosed a VPT method of subjecting a thin film to vapor phase decomposition and drying, and then performing a total reflection X-ray fluorescence analysis without performing a collecting process. In addition, there is disclosed a point that respective apparatus are centrally controlled as an entire system.

CITATION LIST

Patent Literature

[PTL 1] JP 2003-75374 A

Technical Problem

When vapor phase decomposition is performed through use of a vapor phase decomposition apparatus described in Patent Literature 1, it is required for a user to set a time or other such conditions for vapor phase decomposition. The conditions for vapor phase decomposition vary for each sample. However, determination of the conditions for vapor phase decomposition has been performed depending on, for example, skilled engineer's experience and intuition and the results of experiments performed in advance. For example, a silicon substrate having an oxide film on its surface has a surface color different from that of a silicon substrate (bare wafer) having no oxide film, and hence a time that allows the complete vapor phase decomposition of an oxide film can be experimentally obtained by examining a change in color described above.

Therefore, without an experimental result, it has been required to perform an experiment for determining conditions in advance, and hence much time for an analysis has been required. There has also been a problem in that an inexperienced engineer cannot appropriately set the conditions for vapor phase decomposition.

The present invention has been made in view of the above-mentioned problems, and an object thereof is to provide an X-ray analysis system, an X-ray spectrometer, and a vapor phase decomposition apparatus, which are capable of setting appropriate conditions for vapor phase decomposition with ease.

Solution to Problem

An X-ray analysis system according to claim 1 includes an X-ray spectrometer and a vapor phase decomposition apparatus. The X-ray spectrometer includes: an X-ray source configured to irradiate a measurement sample having a thin film present on a surface of the measurement sample with primary X-rays; a detector configured to measure an intensity of reflected X-rays obtained when the primary X-rays are reflected by the surface or an interface of the measurement sample, or an intensity of fluorescent X-rays generated by the primary X-rays; and a calculation unit configured to calculate a film thickness or a coating mass of the thin film based on the intensity of the reflected X-rays or the fluorescent X-rays. The vapor phase decomposition apparatus includes: a vapor phase decomposition portion configured to perform vapor phase decomposition on the thin film; and a control portion configured to determine a vapor phase decomposition time based on the film thickness or the coating mass calculated by the calculation unit.

According to the X-ray analysis system of claim 2, the X-ray analysis system according to claim 1 further includes a storage portion configured to store a preset relationship between the film thickness or the coating mass and the vapor phase decomposition time, and the control portion is configured to determine the vapor phase decomposition time based on the film thickness or the coating mass calculated by the calculation unit and the relationship between the film thickness or the coating mass and the vapor phase decomposition time, which is stored in the storage portion.

According to the X-ray analysis system of claim 3, in the X-ray analysis system according to claim 1 or 2, the control portion is configured to determine the vapor phase decomposition time by multiplying the film thickness or the coating mass calculated by the calculation unit by a preset constant.

According to the X-ray analysis system of claim 4, in the X-ray analysis system according to anyone of claims 1 to 3, the vapor phase decomposition apparatus further includes a dry unit configured to dry liquid droplets generated on the measurement sample through the vapor phase decomposition, and the control portion is further configured to determine a time for the dry unit to dry the liquid droplets based on the film thickness or the coating mass calculated by the calculation unit.

According to the X-ray analysis system of claim 5, in the X-ray analysis system according to anyone of claims 1 to 4, the calculation unit is further configured to calculate a density of the thin film, and the control portion is further configured to correct, based on the density, the determined vapor phase decomposition time and/or the determined time for the drying.

An X-ray spectrometer according to claim 6 includes: an X-ray source configured to irradiate a measurement sample having a thin film present on a surface of the measurement sample with primary X-rays; a detector configured to measure an intensity of reflected X-rays obtained when the primary X-rays are reflected by the surface or an interface of the measurement sample, or an intensity of fluorescent X-rays generated by the primary X-rays; a calculation unit configured to calculate a film thickness or a coating mass of the thin film based on the intensity of the reflected X-rays or the fluorescent X-rays; a storage portion configured to store a preset relationship between the film thickness or the coating mass and a vapor phase decomposition time; and a communication portion configured to transmit the determined vapor phase decomposition time to a vapor phase decomposition apparatus configured to perform vapor phase decomposition on the measurement sample, wherein the calculation unit is further configured to determine the vapor phase decomposition time for the measurement sample based on the calculated film thickness or the calculated coating mass and the preset relationship between the film thickness or the coating mass and the vapor phase decomposition time.

A vapor phase decomposition apparatus according to claim 7 includes: a communication portion configured to acquire a film thickness or a coating mass of a thin film present on a surface of a measurement sample, which has been measured by an X-ray spectrometer, from the X-ray spectrometer; a vapor phase decomposition portion configured to perform vapor phase decomposition on the thin film; a storage portion configured to store a preset relationship between the film thickness or the coating mass and a vapor phase decomposition time; and a control portion configured to determine the vapor phase decomposition time for the measurement sample based on the film thickness or the coating mass, which has been acquired by the communication portion, and the preset relationship between the film thickness or the coating mass and the vapor phase decomposition time.

Advantageous Effects of Invention

According to the inventions according to claims 1 to 7, it is possible to set appropriate conditions for the vapor phase decomposition with ease.

BRIEF DESCRIPTION OF DRAWINGS

FIG. 1 are diagrams for schematically illustrating an X-ray analysis system according to an embodiment of the present invention.

DESCRIPTION OF EMBODIMENTS

Figure 2:
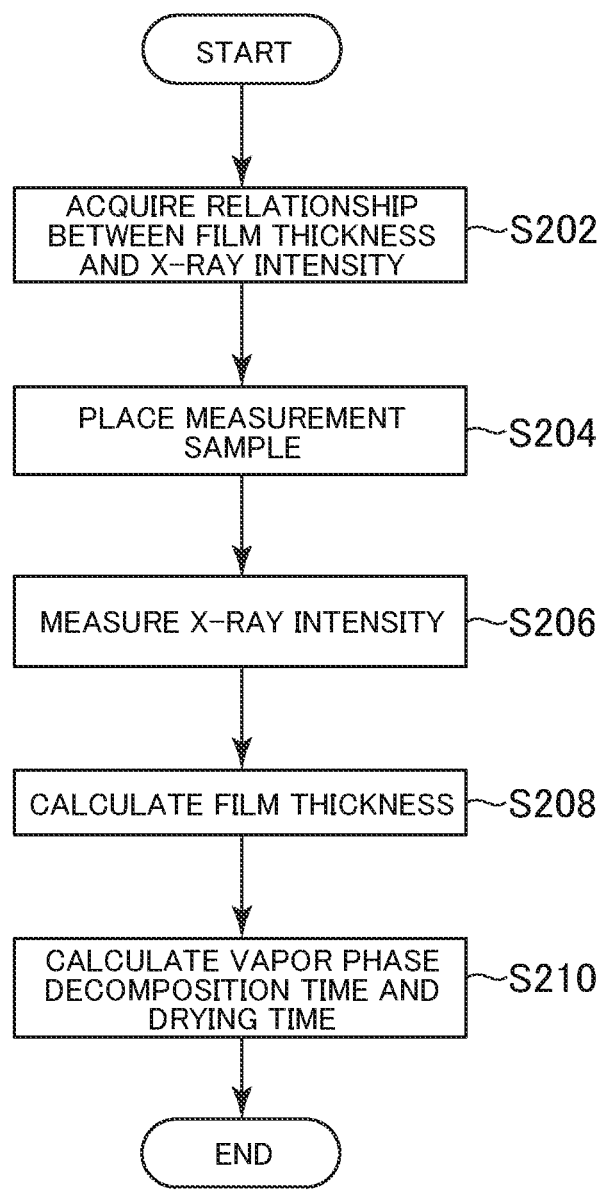
FIG. 2 is a flow chart for illustrating a method of calculating a vapor phase decomposition time and a drying time.

Now, a preferred embodiment for carrying out the present invention is described. FIG. 1(a) is a top view of an X-ray analysis system 100 according to the present invention. FIG. 1(b) is a side view of the X-ray analysis system 100 according to the present invention. The X-ray analysis system 100 includes a transport apparatus 102, a vapor phase decomposition apparatus 104, and an X-ray spectrometer 106. The arrangement layouts illustrated in FIG. 1 are merely an example, and another arrangement layout may be employed. The X-ray analysis system 100 is also described as an integrated system, but independent apparatus may communicate to/from one another directly or via, for example, a host computer to operate in conjunction with each other.

The transport apparatus 102 transports a measurement sample 108 to be measured. Specifically, for example, the transport apparatus 102 includes a seat portion 110 whose height can be changed, a rail portion 112 for moving the seat portion 110, a hand portion 114 for placing the measurement sample 108, and a stretchable portion 116 configured to expand and contract. The transport apparatus 102 transports the measurement sample 108 between the vapor phase decomposition apparatus 104 and the X-ray spectrometer 106 by operating the seat portion 110, the rail portion 112, and the stretchable portion 116.

The vapor phase decomposition apparatus 104 includes: a vapor phase decomposition portion 120 including a dry unit 117 and a sample mounting table 118; and a control portion 132 configured to control the vapor phase decomposition portion 120. The vapor phase decomposition apparatus 104 may also include a collecting portion 130 including: a rotating table 122; a collecting arm 124; a nozzle 126; and a heater 128.

The vapor phase decomposition portion 120 performs vapor phase decomposition on a thin film formed on a surface of the measurement sample 108. Specifically, first, the measurement sample 108 is transported to the inside of the vapor phase decomposition portion 120 by the transport apparatus 102 to be placed on the sample mounting table 118. The measurement sample 108 is, for example, a substrate obtained by forming a silicon oxide ($SiO_2$) thin film on a surface of a silicon (Si) substrate.

After that, a gas that reacts with the thin film formed on the surface of the measurement sample 108 is introduced to the inside of the vapor phase decomposition portion 120 through an introduction pipe. The thin film is dissolved by being exposed to the gas. For example, hydrogen fluoride is introduced to the inside of the vapor phase decomposition portion 120 through the introduction pipe. The hydrogen fluoride dissolves the silicon oxide ($SiO_2$) thin film formed on the surface of the silicon substrate. The inner wall of the vapor phase decomposition portion 120 and the sample mounting table 118 are formed of a material that is not corroded by hydrogen fluoride, for example, polytetrafluoroethylene.

The dry unit 117 dries liquid droplets generated on the measurement sample 108 by vapor phase decomposition, and holds an object to be measured on the surface of the substrate. Specifically, for example, the dry unit 117 includes an inert gas introduction pipe and a discharge pipe. The dry unit 117 introduces an inert gas into the vapor phase decomposition portion 120 through the inert gas introduction pipe to expel hydrogen fluoride. The inert gas is, for example, clean nitrogen. Thus, the dry unit 117 dries the liquid droplets generated on the measurement sample 108. Instead of or in addition to the flowing in of the inert gas, the dry unit 117 may reduce a pressure inside the vapor phase decomposition portion 120 and further heat the liquid droplets generated on the measurement sample 108 by a heater built into the sample mounting table 118, to thereby dry the liquid droplets.

After the thin film is dissolved and dried by the vapor phase decomposition portion 120, the collecting portion 130 performs a collecting operation of moving a collecting liquid for taking in the object to be measured on the surface of the substrate to collect the object to be measured in a concentrated manner. Specifically, after the thin film is dissolved and dried by the vapor phase decomposition portion 120, the measurement sample 108 is first transported to the inside of the collecting portion 130 by the transport apparatus 102. The measurement sample 108 is placed so as to be centered on the rotary axis of the rotating table 122.

Subsequently, the nozzle 126 drips the collecting liquid onto the measurement sample 108. The collecting arm 124 moves the collecting liquid from the center of the substrate toward the edge part of the substrate with the nozzle 126 holding the collecting liquid. When the collecting arm 124 moves the liquid droplets, the rotating table 122 rotates the measurement sample 108, to thereby cause the collecting liquid to take in the object to be measured adhering to the entire measurement sample 108.

After the object to be measured on the substrate is collected into the collecting liquid, the collecting arm 124 separates the collecting liquid from the nozzle 126 at a position set on the measurement sample 108 in advance. Through this separation, the collecting liquid into which the object to be measured has been taken in is left at a predetermined position on the substrate. The collecting liquid is, for example, a hydrofluoric acid solution.

The heater 128 dries the collecting liquid so that the object to be measured collected from the entire surface of the substrate is held at one point on the surface of the substrate. Specifically, for example, the heater 128 is a halogen lamp. The heater 128 heats and dries the collecting liquid separated from the nozzle 126.

The control portion 132 determines a vapor phase decomposition time based on a film thickness or a coating mass. Specifically, for example, the control portion 132 is an information processing apparatus such as a personal computer (PC). A time required for vapor phase decomposition varies depending on the material, film thickness, density, and coating mass of a thin film. The control portion 132 determines an appropriate vapor phase decomposition time by a method described later.

The X-ray spectrometer 106 calculates the film thickness or the coating mass of the thin film formed on the surface of the measurement sample 108. Specifically, for example, the X-ray spectrometer 106 is an X-ray fluorescence spectrometer 106 configured to perform an elemental analysis based on the intensity of the fluorescent X-rays. The X-ray spectrometer 106 includes a sample stage 134, an X-ray source 136, a detector 138, a counter 140, and a calculation unit 142.

On the sample stage 134, the measurement sample 108 is placed. Specifically, as illustrated in FIG. 1(a) and FIG. 1(b), when the measurement sample 108 is transported by the transport apparatus 102, the measurement sample 108 is placed on the sample stage 134 with the surface, on which the thin film to be measured is formed, facing upward.

The X-ray source 136 irradiates the measurement sample 108 having a thin film present on its surface with primary X-rays. Specifically, for example, the X-ray source 136 applies primary X-rays while changing the incident angle on the surface of the measurement sample 108 across a total reflection critical angle of the measurement sample 108. The X-ray source 136 irradiates the surface of the measurement sample 108 with an angle range between an angle smaller than the total reflection critical angle by 0.3 degrees and an angle larger than the total reflection critical angle by 0.3 degrees (illustrated at an angle larger than an actual irradiation angle for an explanatory purpose). In this case, the total reflection critical angle is an angle inherent in the measurement sample 108. The angle range is set within a range in which the total reflection critical angle can be acquired from a differential curve described later. The measurement sample 108 irradiated with primary X-rays generates fluorescent X-rays.

The detector 138 measures the intensity of the fluorescent X-rays generated by the primary X-rays. Specifically, for example, the detector 138 is a semiconductor detector such as an SDD detector. The detector 138 measures the intensity of the fluorescent X-rays, and outputs a pulse signal having a pulse height corresponding to the measured energy of the fluorescent X-rays. The detector 138 measures the intensity of the fluorescent X-rays each time the X-ray source 136 changes the incident angle of the fluorescent X-rays with respect to the measurement sample 108.

The counter 140 counts, based on the pulse height, pulse signals that are each output as the measured intensity by the detector 138. Specifically, for example, the counter 140 is a multi-channel analyzer, and counts the pulse signals output by the detector 138 for each channel corresponding to the energy of the fluorescent X-rays to output the count to the calculation unit 142 as the intensity of the fluorescent X-rays.

The calculation unit 142 calculates the film thickness or the coating mass of the thin film containing an analytical element contained in the measurement sample 108 based on the intensity of the reflected X-rays or the fluorescent X-rays. Specific processing performed by the calculation unit 142 is described along with a method of determining the vapor phase decomposition time and the drying time.

FIG. 2 is a flow chart for illustrating a method of determining the vapor phase decomposition time and the drying time based on the film thickness or the coating mass in the present invention. First, the X-ray spectrometer 106 acquires a relationship between a film thickness or a coating mass and an X-ray intensity (Step S202). Specifically, the X-ray spectrometer 106 acquires a relationship between the film thickness or the coating mass of a sample whose film thickness or coating mass is known and the intensity of the fluorescent X-rays generated from the sample. For example, when information indicating a relationship between the film thickness or the coating mass and the intensity of the fluorescent X-rays is stored in a storage portion (not shown)

included in the calculation unit 142, the X-ray spectrometer 106 acquires a relationship between the film thickness and X-ray intensity.

The vapor phase decomposition apparatus 104 may have a configuration including a storage portion. Specifically, the control portion 132 included in the vapor phase decomposition apparatus 104 may have a configuration including a storage portion configured to store the information indicating the relationship between the film thickness or the coating mass and the X-ray intensity. When the X-ray spectrometer 106 and the vapor phase decomposition apparatus 104 are configured separately from each other, the storage portion may be included in a host computer configured to transmit and receive information to/from both the X-ray spectrometer 106 and the vapor phase decomposition apparatus 104.

Figure 3:
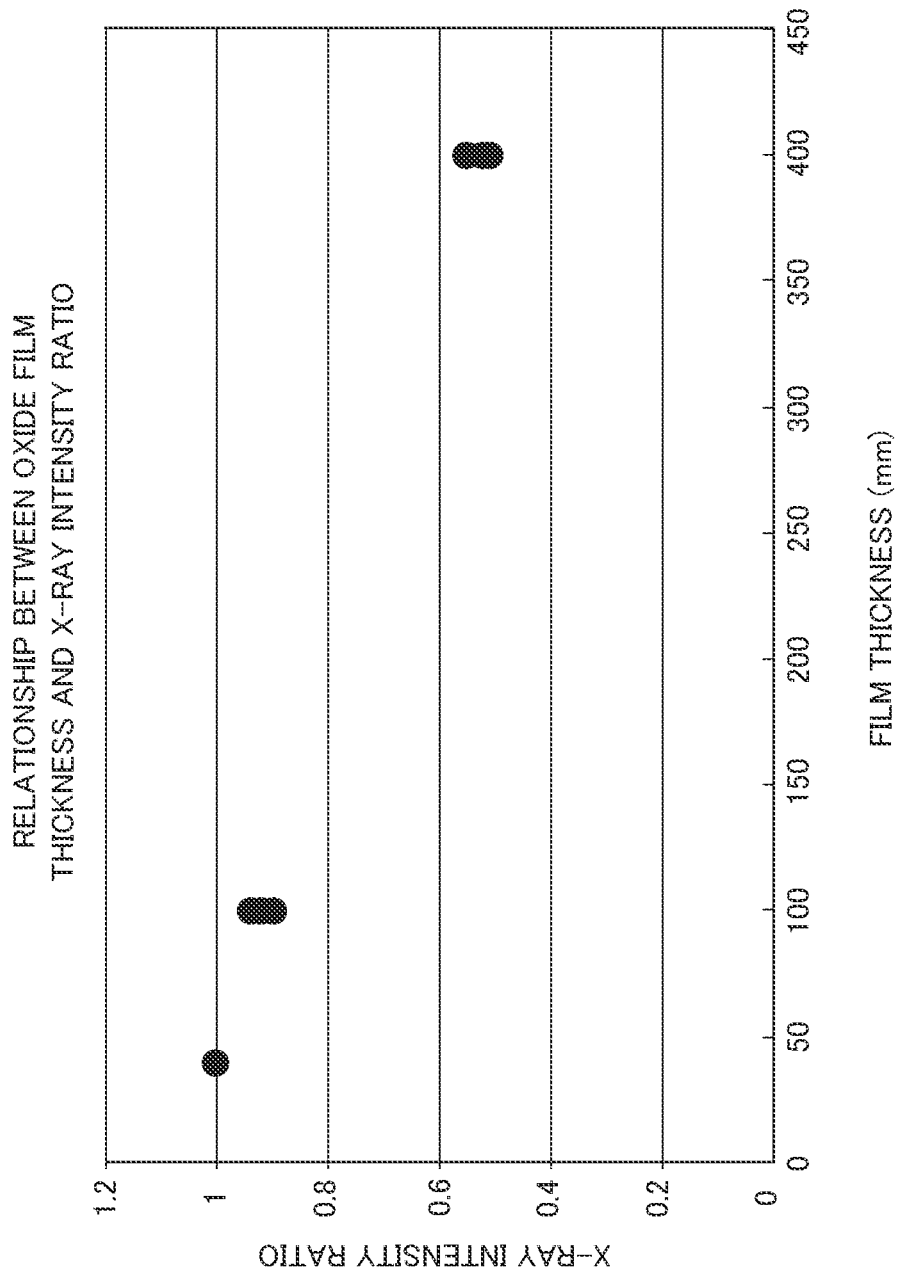
FIG. 3 is a graph for showing an example of a preset relationship between a film thickness and an X-ray intensity.

FIG. 3 is a graph for showing a relationship between the film thickness of the silicon oxide ($SiO_2$) thin film formed on the surface of the silicon substrate and an X-ray intensity ratio. The X-ray intensity on a substrate having no thin film formed thereon is used as a reference, and hence the vertical axis of FIG. 3 represents the X-ray intensity ratio instead of the X-ray intensity. The X-ray intensity ratio is a ratio of the intensity of Si—Kα rays, which are fluorescent X-rays ascribable to the element of Si, between when a sample in which no thin film is formed on a silicon substrate is measured and when a sample in which a thin film is formed on a silicon substrate is measured.

As shown in FIG. 3, as the film thickness of the thin film increases, the X-ray intensity ratio decreases. The intensity of the Si—Kα rays ascribable to the silicon oxide ($SiO_2$) thin film increases as the film thickness of the thin film increases. This phenomenon is ascribable to the fact that the Si—Kα rays generated from the silicon substrate are absorbed by the silicon oxide ($SiO_2$) thin film. When the element constituting the thin film is different from the element constituting the substrate, the intensity of the fluorescent X-rays ascribable to the element constituting the thin film may be used. In this case, as the film thickness of the thin film increases, the intensity of the fluorescent X-rays ascribable to the element constituting the thin film increases. The X-ray spectrometer 106 measures in advance the intensity of the fluorescent X-rays generated from a sample whose film thickness or coating mass of the thin film is known, to thereby acquire a relationship between the film thickness or the coating mass and the X-ray intensity (or X-ray intensity ratio). The X-ray spectrometer 106 may also acquire the relationship between the film thickness or the coating mass and the X-ray intensity (or X-ray intensity ratio) based on literature values. In this case, an X-ray fluorescence spectrometer is described as an example, but in general, the film thickness or the coating mass is often measured through use of an X-ray reflectometer or an ellipsometer.

Subsequently, the measurement sample 108 is placed on the sample stage 134 (Step S204). The following description is given on the assumption that the measurement sample 108 is a substrate obtained by forming a silicon oxide ($SiO_2$) thin film on the surface of a silicon substrate. The measurement sample 108 is placed on the sample stage 134 by the transport apparatus 102.

Subsequently, the calculation unit 142 acquires the intensity of the fluorescent X-rays counted by the counter 140 (Step S206). Specifically, the X-ray source 136 irradiates the measurement sample 108 with primary X-rays. The calculation unit 142 acquires the intensity of the Si—Kα rays detected by the detector 138 and counted by the counter 140. The calculation unit 142 also calculates a ratio between the intensity of the Si—Kα rays measured when the sample in which no thin film is formed on the silicon substrate is irradiated with the primary X-rays and the acquired intensity of the Si—Kα rays.

Subsequently, the calculation unit 142 calculates the film thickness or the coating mass (Step S208). Specifically, the calculation unit 142 calculates the film thickness of the thin film formed on the measurement sample 108 based on the X-ray intensity ratio calculated in Step S206 and the relationship between the film thickness or the coating mass and the X-ray intensity ratio acquired in Step S202. As shown in FIG. 3, the film thickness and the X-ray intensity ratio are in a proportional relationship, and hence the calculation unit 142 can calculate the film thickness based on the X-ray intensity ratio calculated in Step S206.

The X-ray spectrometer 106 may calculate the film thickness by first measuring the coating mass and then dividing the coating mass by a predetermined density ($\rho_0$ described later). In this case, first, the X-ray spectrometer 106 acquires a relationship between the coating mass and the X-ray intensity (or X-ray intensity ratio) (Step S202). Then, the calculation unit 142 calculates the coating mass of the thin film formed on the measurement sample 108 based on the X-ray intensity (or X-ray intensity ratio) calculated in Step S206 and the relationship between the coating mass and the X-ray intensity (or X-ray intensity ratio) acquired in Step S202. The calculation unit 142 may also calculate the film thickness by dividing the coating mass by a predetermined density.

Subsequently, the control portion 132 determines the vapor phase decomposition time and the drying time based on the film thickness or the coating mass (Step S210). Specifically, for example, the control portion 132 determines a time corresponding to the film thickness or the coating mass calculated in Step S208 as the vapor phase decomposition time to be applied to the measurement sample 108 based on a preset relationship between the film thickness or the coating mass and the vapor phase decomposition time.

The control portion 132 further determines a time corresponding to the film thickness or the coating mass calculated in Step S208 as the drying time to be applied to the measurement sample 108 based on a preset relationship between the film thickness or the coating mass and the drying time. The preset relationship between the film thickness or the coating mass and the vapor phase decomposition time and the preset relationship between the film thickness or the coating mass and the drying time are determined, for example, experimentally. The relationships are stored in the storage portion. The storage portion is provided to the control portion 132, the calculation unit 142, or the host computer. The host computer is an information processing apparatus configured to transmit and receive information to/from the X-ray spectrometer 106 and the vapor phase decomposition apparatus 104.

Figure 4:
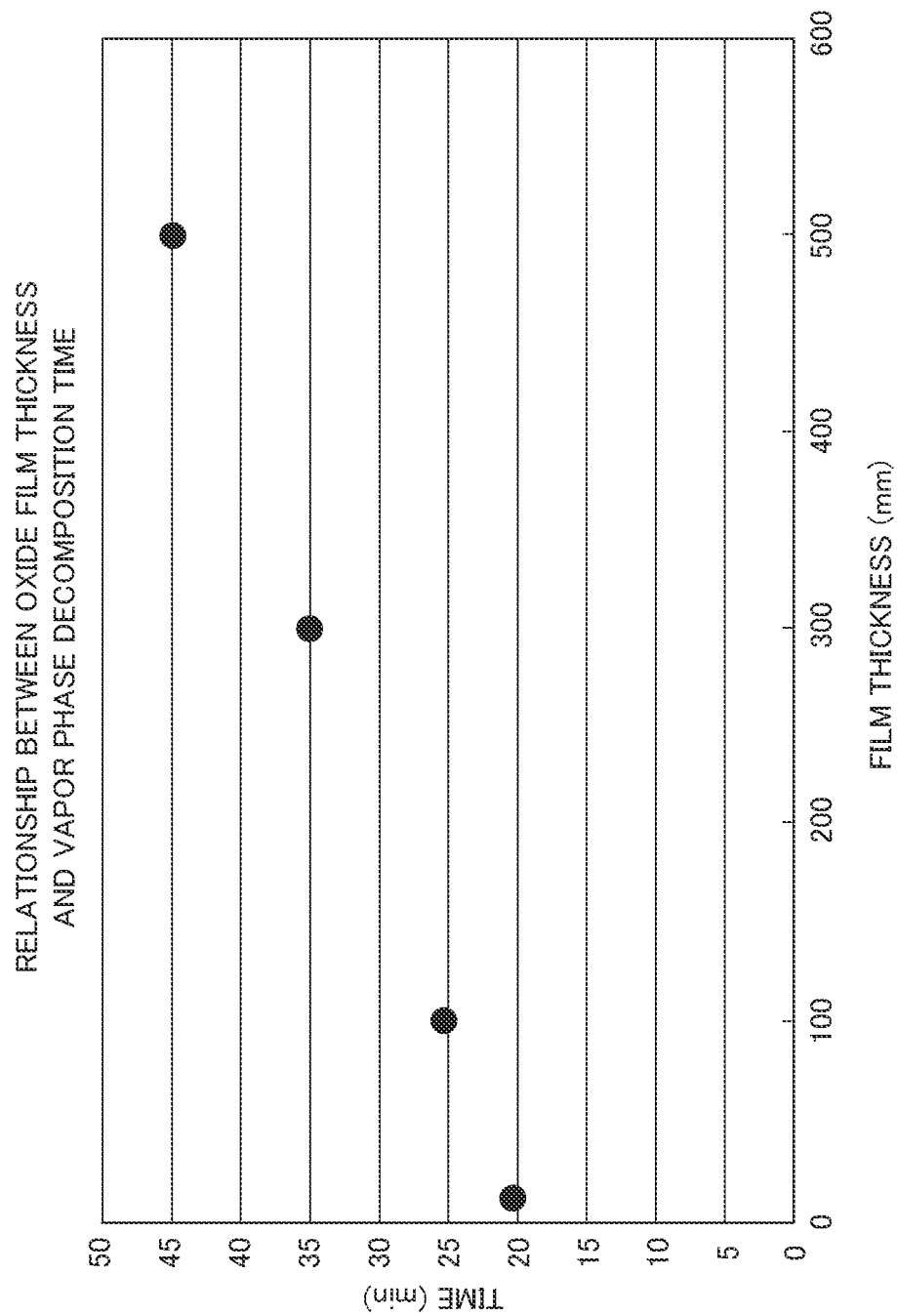
FIG. 4 is a graph for showing an example of a preset relationship between a film thickness and a vapor phase decomposition time.

FIG. 4 is a graph for showing an example of a preset relationship between the film thickness and the vapor phase decomposition time. As the film thickness of the thin film increases, the time required for vapor phase decomposition becomes longer. Therefore, as shown in FIG. 4, the vapor phase decomposition time corresponding to the film thickness is set so as to become longer as the film thickness increases. As each vapor phase decomposition time corresponding to each film thickness, a time required for sufficiently dissolving the thin film is set based on a measurement result.

Figure 5:
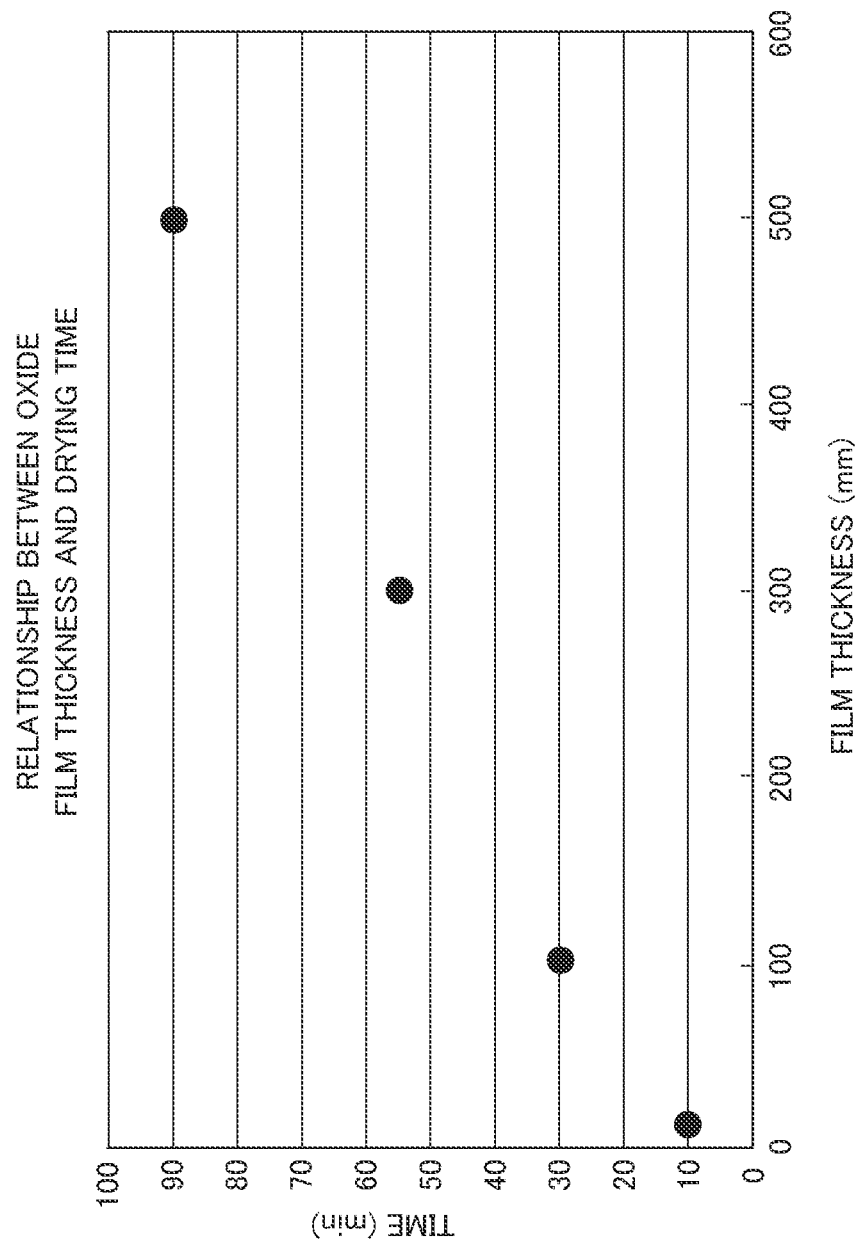
FIG. 5 is a graph for showing an example of a preset relationship between a film thickness and a drying time.

FIG. 5 is a graph for showing an example of a preset relationship between the film thickness and the drying time.

As the film thickness of the thin film increases, the number of liquid droplets generated on the substrate due to vapor phase decomposition increases, and a time required for drying increases. Therefore, as shown in FIG. 5, the drying time corresponding to the film thickness is set so as to become longer as the film thickness increases. As each drying time corresponding to each film thickness, a time required for sufficiently drying the liquid droplets is set based on a measurement result.

The control portion 132 may determine the vapor phase decomposition time based on a relationship different for each material of the thin film. Specifically, when thin films are made of different materials even with the same film thickness, the time required for vapor phase decomposition differs. In view of this, the control portion 132 may determine the vapor phase decomposition time for each material of the thin film through use of a relationship corresponding to the material. In the same manner, the control portion 132 may determine the drying time based on a relationship different for each material of the thin film.

The control portion 132 may also determine the vapor phase decomposition time and the drying time by multiplying the film thickness calculated in Step S208 by a preset constant. In addition, the required vapor phase decomposition time and drying time differ depending on the material of the thin film, and hence the control portion 132 may determine the vapor phase decomposition time and the drying time by multiplying the calculated film thickness by a constant different for each material of the thin film. The control portion 132 may also calculate the vapor phase decomposition time and the drying time not by simply multiplying the calculated film thickness by a constant but by any other calculation method as long as the required vapor phase decomposition time and drying time become longer as the film thickness increases with the calculation method.

It is also desired that the preset relationship between the film thickness and the vapor phase decomposition time and the preset relationship between the film thickness and the drying time be determined on the assumption that the density of the thin film has a predetermined value. For example, the relationship between the film thickness and the vapor phase decomposition time shown in FIG. 4 and the relationship between the film thickness and the drying time shown in FIG. 5 are relationships determined on the assumption that the density of a silicon oxide ($SiO_2$) is $\rho_0$.

As described above, simple measurement of only the film thickness or the coating mass enables easy calculation of appropriate conditions for vapor phase decomposition. This allows even an unskilled engineer to calculate appropriate conditions for vapor phase decomposition.

In the flow chart illustrated in FIG. 2, the method of calculating the vapor phase decomposition time and the drying time based on the film thickness or the coating mass has been described, but the vapor phase decomposition time and the drying time may be corrected based on the density of the thin film.

Figure 6:
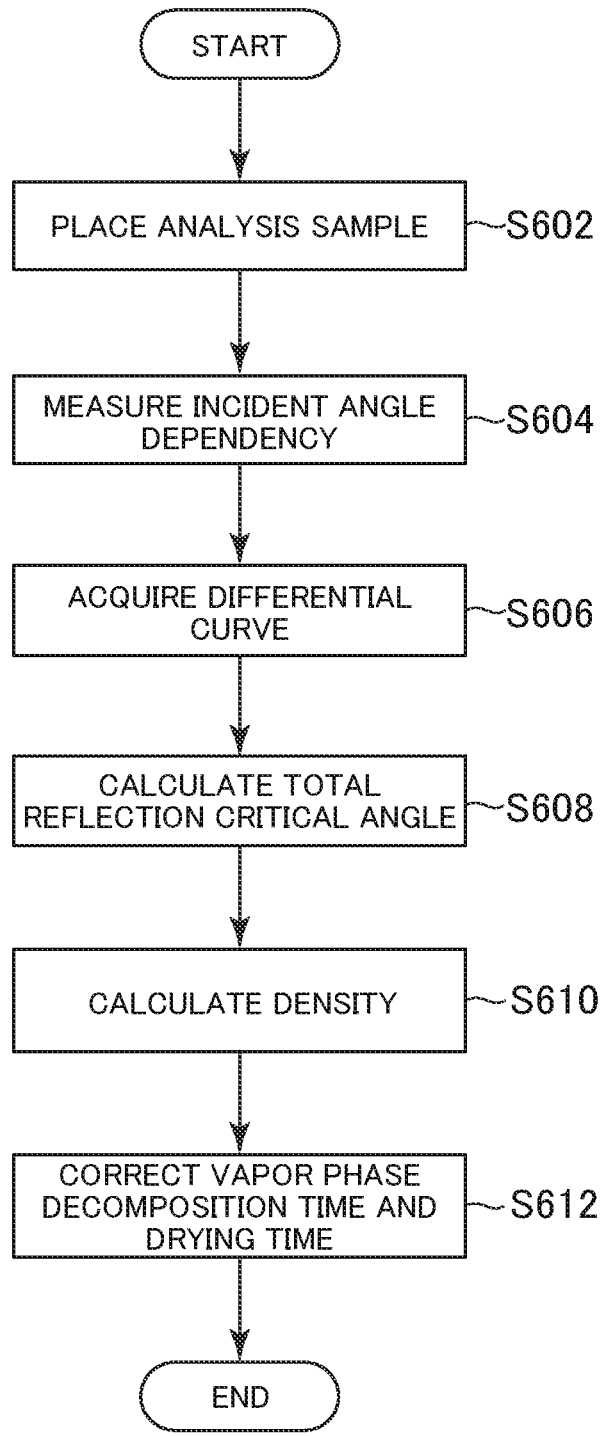
FIG. 6 is a flowchart for illustrating a method of correcting a vapor phase decomposition time and a drying time.

FIG. 6 is a flow chart for illustrating a method of determining the vapor phase decomposition time and the drying time based on the density in the present invention. The description of the method presupposes that the vapor phase decomposition time and the drying time have been calculated by the flow illustrated in FIG. 2.

First, the measurement sample 108 is placed on the sample stage 134 (Step S602). In the same manner as in Step S204, the measurement sample 108 is placed on the sample stage 134 by the transport apparatus 102.

Subsequently, the X-ray spectrometer 106 measures the incident angle dependency of a fluorescent X-ray intensity (Step S604). Specifically, the X-ray source 136 applies primary X-rays while changing the incident angle on the surface of the measurement sample 108 across the total reflection critical angle of the measurement sample 108. The calculation unit 142 acquires the intensity of the fluorescent X-rays counted by the counter 140 for each incident angle of the primary X-rays with respect to the measurement sample 108.

Figure 7:
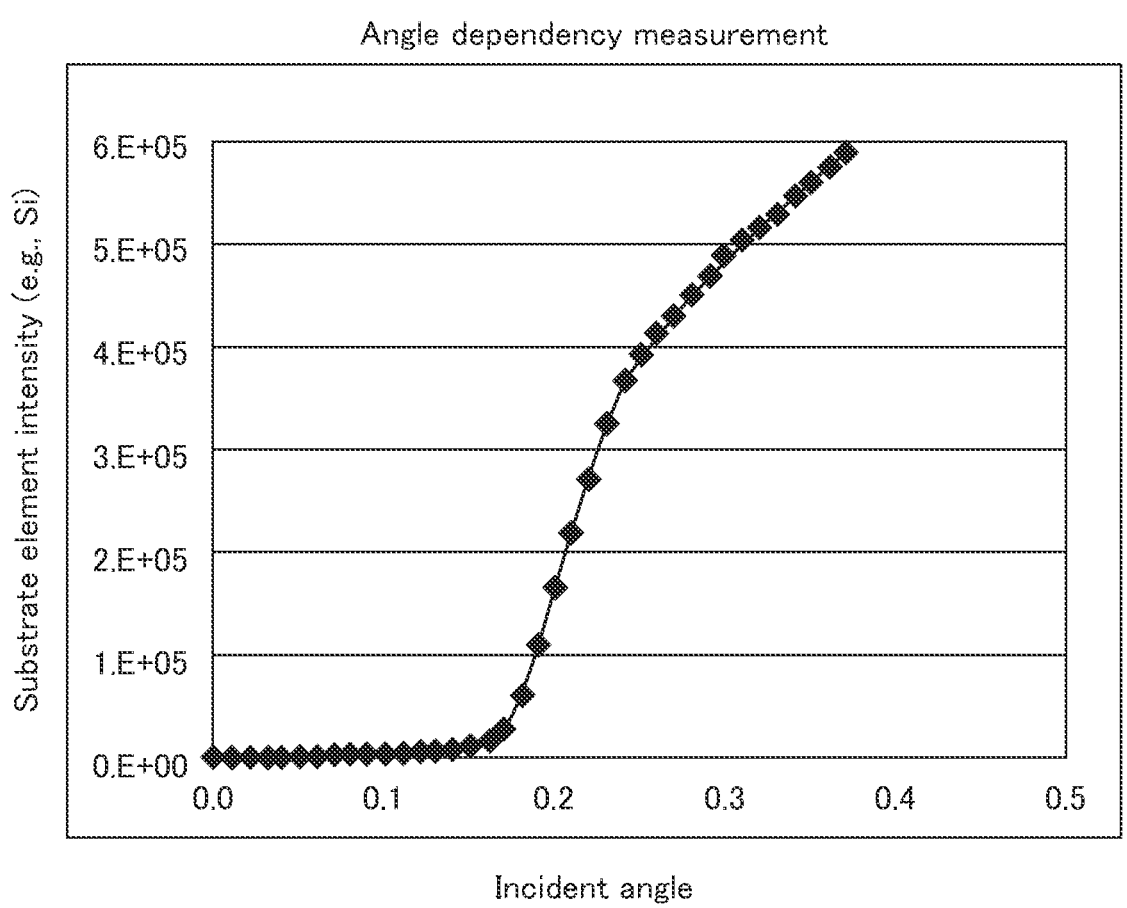
FIG. 7 is a graph for showing an example of the incident angle dependency of a fluorescent X-ray intensity.

FIG. 7 is an example for showing a relationship between the incident angle and the intensity of the fluorescent X-rays (Si—K$\alpha$ rays) of Si being a constituent element of a silicon substrate having no thin film formed thereon, which is measured on the silicon substrate. As shown in FIG. 7, as the incident angle increases, the intensity of the fluorescent X-rays sharply increases after a specific angle is exceeded. In addition, the relationship between the incident angle and the intensity of the fluorescent X-rays has an inflection point. At angles larger than the inflection point, the inclination of the intensity of the fluorescent X-rays becomes gradually gentler.

Above change in fluorescent X-ray intensity occurs due to the following phenomenon. That is, when the incident angle is smaller than the total reflection critical angle, primary X-rays do not intrude into the inside of the measurement sample 108 due to total reflection on the surface of the measurement sample 108. Therefore, the fluorescent X-rays generated at the above-mentioned incident angle are very small. Meanwhile, when the incident angle becomes larger than the total reflection critical angle, primary X-rays enter the inside of the measurement sample 108. When primary X-rays enter the inside of the measurement sample 108, fluorescent X-rays excited by the primary X-rays that have entered the inside are generated, and as a result, the fluorescent X-rays detected by the detector 138 increase.

Subsequently, the calculation unit 142 acquires a differential curve by differentiating the relationship between the intensity of the fluorescent X-rays and the incident angle with respect to the incident angle (Step S606). Specifically, the calculation unit 142 differentiates the relationship between the intensity of the fluorescent X-rays (Si—K$\alpha$ rays) acquired in Step S604 and the incident angle with respect to the incident angle, to thereby acquire such a differential curve as shown in FIG. 8.

Figure 8:
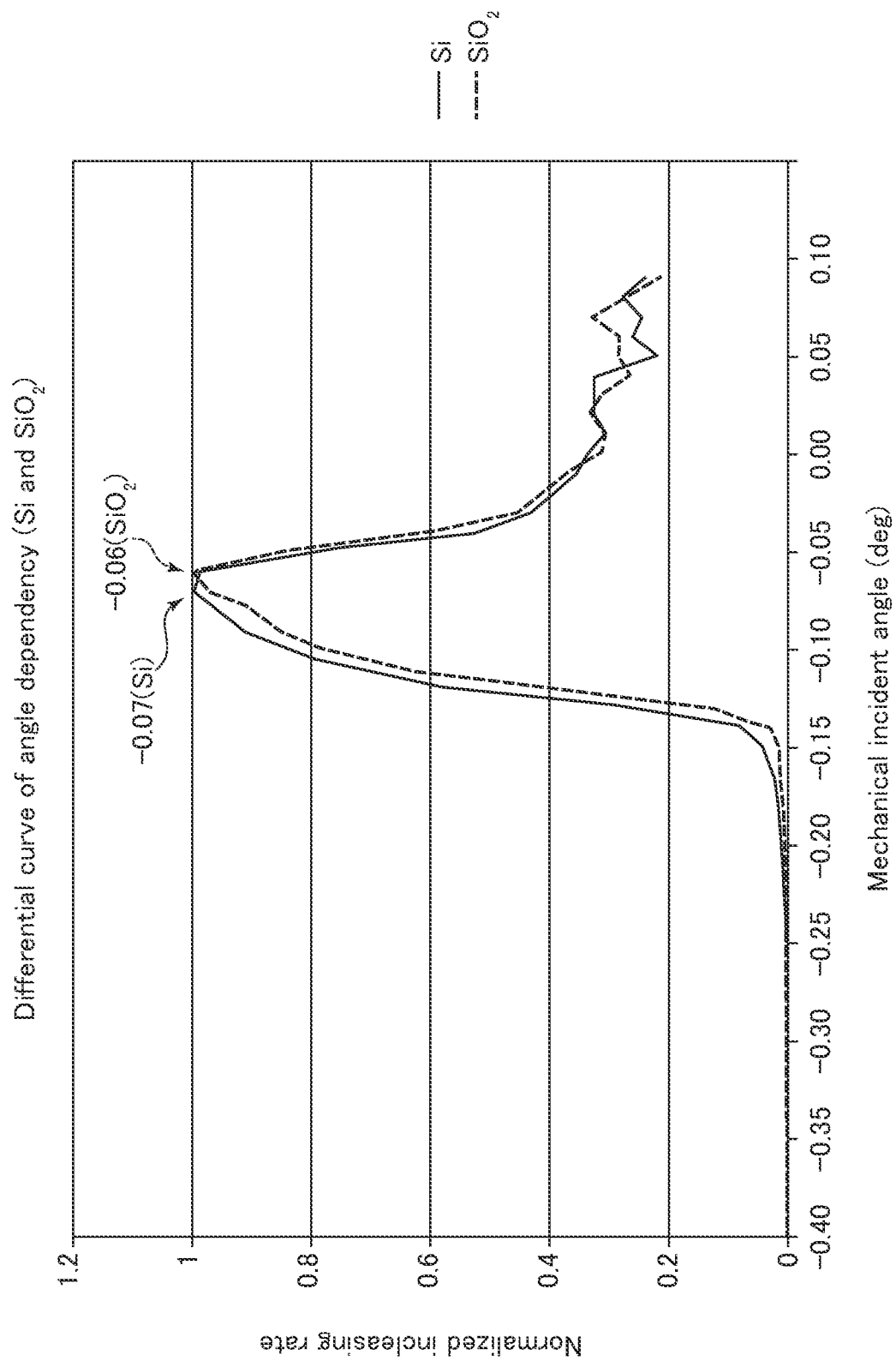
FIG. 8 is a graph for showing an example of a differential curve.

FIG. 8 is a graph for showing differential curves acquired based on the intensity of the fluorescent X-rays (Si—K$\alpha$ rays) with respect to two kinds of measurement samples 108. The two kinds of measurement samples 108 are a silicon substrate and a silicon substrate having a silicon oxide ($SiO_2$) thin film formed on its surface.

Subsequently, the calculation unit 142 acquires a total reflection critical angle from the differential curve (Step S608). As shown in FIG. 7, the relationship between the incident angle and the intensity of the fluorescent X-rays has an inflection point. Therefore, as shown in FIG. 8, the differential curve has a peak. In addition, the position of the peak differs for each measurement sample 108. The calculation unit 142 acquires an angle at the peak of the differential curve acquired in Step S606 as the total reflection critical angle. In this case, the horizontal axis of FIG. 7 represents an optically calibrated incident angle. The experimental results shown in FIG. 7 are obtained by measuring a silicon substrate, and have an inflection point at a total reflection critical angle of 0.18°. The horizontal axis of FIG. 8 represents an incident angle mechanically set by an actual apparatus. That is, the horizontal axis of FIG. 8 represents the incident angle before being optically calibrated. The experimental results shown in FIG. 8 were obtained by measuring a silicon substrate having a silicon oxide ($SiO_2$) thin film formed on its surface (hereinafter referred to as "sample $SiO_2$") and a silicon substrate having a known total reflection critical angle (0.18°) (hereinafter referred to as "sample Si").

Note that, in manufacturing an actual apparatus, it is difficult to set the sample stage 134 strictly horizontally with respect to the optical origin angle at which primary X-rays are applied. In addition, a slight angle error may occur when the sample is placed. Therefore, the acquired total reflection critical angle includes an error due to the inclination of the measurement sample 108. The calculation unit 142 may calculate the total reflection critical angle by correcting a peak angle measured by an actual apparatus in consideration of the error. Specifically, for example, in FIG. 8, an incident angle at the peak of the differential curve for the sample $SiO_2$ is −0.06°, which is larger than an incident angle of −0.07° at the peak of the sample Si by 0.01°. As a result, the total reflection critical angle of the sample $SiO_2$ is calculated as 0.19°.

Subsequently, the calculation unit 142 calculates the density of the measurement sample 108 based on the total reflection critical angle and the wavelength of primary X-rays (Step S610). Specifically, the calculation unit 142 calculates the density of the measurement sample 108 by applying the total reflection critical angle calculated in Step S608 and the wavelength of primary X-rays applied to the measurement sample 108 to Math 1 representing the relationship between the total reflection critical angle and the density.

$$\phi c = \alpha \times \lambda \times \left(\rho \times \frac{Z}{A}\right)^{\frac{1}{2}} \quad \text{[Math 1]}$$

In Math 1, φc represents a total reflection critical angle, α represents a constant, λ represents the wavelength of primary X-rays applied to the measurement sample 108, Z represents an atomic number, and A represents a mass number. For example, it is assumed that Ti has an atomic number of 22 and a mass number of 48, and Co has an atomic number of 27 and a mass number of 59. When W-Lβ rays are used as the primary X-rays, λ is set to 0.1282 nm. In a unit system in which those numerical values are used, α=1.33 is used. The only unknown number included in the right-hand side of Math 1 is the density ρ (g/cm³) of the thin film present on the surface of the measurement sample 108 irradiated with the primary X-rays. Meanwhile, the total reflection critical angle on the left-hand side is calculated in Step S608. Therefore, the calculation unit 142 can calculate the density by Math 1.

Subsequently, the control portion 132 corrects the vapor phase decomposition time and the drying time (Step S612). Specifically, the calculation unit 142 uses Math 2 to correct the vapor phase decomposition time and the drying time determined in Step S210.

$$t = \rho/\rho_0 \quad \text{[Math 2]}$$

In Math 2, t represents the corrected vapor phase decomposition time or drying time, ρ represents the density calculated in Step S610, and $\rho_0$ represents the density assumed when the preset relationship between the film thickness and the vapor phase decomposition time and the preset relationship between the film thickness and the drying time were set.

The times required for vapor phase decomposition and drying vary depending on not only the film thickness but also the density. According to the above-mentioned method, the vapor phase decomposition time and the drying time can be determined with more accuracy by considering the density in addition to the film thickness in determining the vapor phase decomposition time and the drying time.

The density may be used to correct not only the film thickness but also the coating mass and the constant. Specifically, for example, when the coating mass is calculated in Step S208, the coating mass may be corrected through use of the same t value as described above. Then, in Step S210, the vapor phase decomposition time and the drying time may be determined based on the corrected coating mass.

Further, for example, when the vapor phase decomposition time and the drying time are determined by multiplying the calculated film thickness by a constant different for each material of the thin film, the vapor phase decomposition time and the drying time may be determined after the constant is corrected by the above-mentioned t value. Specifically, the vapor phase decomposition time and the drying time may be determined by multiplying the calculated film thickness by the above-mentioned constant and the above-mentioned t value.

The present invention is not limited to the embodiment described above, and various modifications can be made. The configuration of the X-ray fluorescence analysis system 100 described above is an example, and the present invention is not limited thereto. The configuration of the X-ray fluorescence analysis system 100 may be replaced by a configuration substantially the same as the configuration described above in the embodiment, a configuration producing the same operation and effect, or a configuration achieving the same object.

For example, the case in which the X-ray spectrometer 106 is an X-ray fluorescence spectrometer has been described above. However, the X-ray spectrometer 106 may be configured as an X-ray reflectivity measuring apparatus configured to calculate the film thickness or the coating mass of the thin film based on the intensity of the reflected X-rays. In this case, the detector 138 measures the intensity of the reflected X-rays obtained when the primary X-rays are reflected by the surface or an interface of the measurement sample 108. Then, the film thickness and the density of the thin film calculated in Step S208 and Step S610 may be acquired through X-ray reflectivity measurement.

When the X-ray spectrometer 106 and the vapor phase decomposition apparatus 104 are each configured as an independent apparatus, each apparatus may include a communication portion.

Specifically, for example, the vapor phase decomposition apparatus 104 may include a communication portion configured to acquire the film thickness or the coating mass calculated by the calculation unit 142 directly from the X-ray spectrometer 106 or via a host computer.

In another case, for example, the X-ray spectrometer 106 may be configured to determine the vapor phase decomposition time and/or the drying time, and transmit the determined time to the vapor phase decomposition apparatus 104. Specifically, a calculation unit included in the X-ray spectrometer 106 may include a storage portion configured to store a preset relationship between the film thickness or the coating mass and the vapor phase decomposition time or the drying time. Then, the calculation unit 142 may not only calculate the film thickness or the coating mass but also determine the vapor phase decomposition time or the drying time of a measurement sample based on the calculated film thickness or coating mass and the preset relationship between the film thickness or the coating mass and the vapor phase decomposition time or the drying time. The X-ray spectrometer 106 may also include a communication portion configured to transmit the vapor phase decomposition time determined by the calculation unit 142 to the vapor phase decomposition apparatus 104 configured to perform vapor phase decomposition on the measurement sample 108 or the host computer. In addition, the vapor phase decomposition apparatus 104 may include a communication portion configured to acquire the vapor phase decomposition time or the drying time determined by the calculation unit 142 directly from the X-ray spectrometer 106 or via the host computer.

Further, the vapor phase decomposition apparatus 104 may be combined with an ellipsometer, a reflectometer, or another such apparatus configured to measure a film thickness. In this case, the vapor phase decomposition apparatus 104 may include a communication portion configured to acquire the film thickness or the coating mass of the thin film present on the surface of the measurement sample 108, which has been measured by the ellipsometer or the reflectometer, directly from the ellipsometer or the reflectometer, or via the host computer.

REFERENCE SIGNS LIST

100 X-ray analysis system, 102 transport apparatus, 104 vapor phase decomposition apparatus, 106 X-ray spectrometer, 108 measurement sample, 110 seat portion, 112 rail portion, 114 hand portion, 116 stretchable portion, 117 dry unit, 118 sample mounting table, 120 vapor phase decomposition portion, 122 rotating table, 124 collecting arm, 126 nozzle, 128 heater, 130 collecting portion, 132 control portion, 134 sample stage, 136 X-ray source, 138 detector, 140 counter, 142 calculation unit

The invention claimed is:
1. An X-ray analysis system, comprising:
an X-ray spectrometer; and
a vapor phase decomposition apparatus,
wherein the X-ray spectrometer includes:
   an X-ray source configured to irradiate a measurement sample with primary X-rays, the measurement sample comprising a substrate and a thin film present on a surface of the substrate;
   a detector configured to measure an intensity of reflected X-rays or an intensity of fluorescent X-rays generated by the primary X-rays, obtained when the primary X-rays are reflected by the surface of the thin film or are reflected by an interface between the substrate and the thin film; and
   a calculation unit configured to calculate a film thickness or a coating mass of the thin film and a density of the thin film based on the intensity of the reflected X-rays or the fluorescent X-rays, and
wherein the vapor phase decomposition apparatus includes:
   a vapor phase decomposition portion configured to perform vapor phase decomposition on the thin film; and
   a control portion configured to determine a vapor phase decomposition time based on the film thickness of the thin film or the coating mass calculated by the calculation unit and correct, based on the density, the determined vapor phase decomposition time.
2. The X-ray analysis system according to claim 1, further comprising a storage portion configured to store a preset relationship between the film thickness or the coating mass and the vapor phase decomposition time,
   wherein the control portion is configured to determine the vapor phase decomposition time based on the film thickness or the coating mass calculated by the calculation unit and the relationship between the film thickness or the coating mass and the vapor phase decomposition time, which is stored in the storage portion.
3. The X-ray analysis system according to claim 1, wherein the control portion is configured to determine the vapor phase decomposition time by multiplying the film thickness or the coating mass calculated by the calculation unit by a preset constant.
4. The X-ray analysis system according to claim 1,
   wherein the vapor phase decomposition apparatus further includes a dry unit configured to dry liquid droplets generated on the measurement sample through the vapor phase decomposition, and
   wherein the control portion is further configured to determine a time for the dry unit to dry the liquid droplets based on the film thickness or the coating mass calculated by the calculation unit.
5. The X-ray analysis system according to claim 4,
   wherein the control portion is further configured to correct, based on the density, the determined time for the drying.
6. An X-ray spectrometer, comprising:
   an X-ray source configured to irradiate a measurement sample with primary X-rays, the measurement sample comprising a substrate and a thin film present on a surface of the substrate;
   a detector configured to measure an intensity of reflected X-rays or an intensity of fluorescent X-rays generated by the primary X-rays obtained when the primary X-rays are reflected by the surface of the thin film or are reflected by an interface between the substrate and the thin film;
   a calculation unit configured to calculate a film thickness or a coating mass of the thin film and a density of the thin film based on the intensity of the reflected X-rays or the fluorescent X-rays;
   a storage portion configured to store a preset relationship between the film thickness or the coating mass and a vapor phase decomposition time; and
   a communication portion,
   wherein the calculation unit is further configured to determine the vapor phase decomposition time for the measurement sample based on the calculated film thickness of the thin film or the calculated coating mass and the preset relationship between the film thickness of the thin film or the coating mass and the vapor phase decomposition time and correct, based on the density, the determined vapor phase decomposition time; and
   wherein the communication portion is configured to transmit the corrected determined vapor phase decomposition time to a vapor phase decomposition apparatus which is configured to perform vapor phase decomposition on the measurement sample.
7. A vapor phase decomposition apparatus, comprising:
   a communication portion configured to acquire a film thickness or a coating mass of a thin film present on a surface of a measurement sample, which has been measured by an Xray spectrometer, and further configured to acquire a density of the thin film from the X-ray spectrometer;
   a vapor phase decomposition portion configured to perform vapor phase decomposition on the thin film;

a storage portion configured to store a preset relationship between the film thickness or the coating mass and a vapor phase decomposition time; and a control portion configured to determine the vapor phase decomposition time for the measurement sample based on the film thickness of the thin film or the coating mass, which has been acquired by the communication portion, and the preset relationship between the film thickness of the thin film or the coating mass and the vapor phase decomposition time and correct, based on the density, the determined vapor phase decomposition time.

* * * * *